(12) United States Patent
Tillessen et al.

(10) Patent No.: US 9,096,378 B2
(45) Date of Patent: Aug. 4, 2015

(54) CONNECTING DEVICE FOR A TROUGH PAN OF EXTRACTION DEVICES, TROUGH PAN AND ATTACHMENT THEREFOR

(75) Inventors: Uwe Tillessen, Kamen (DE); Frank Schlüsener, Dortmund (DE); Ingo Pruss, Wuppertal (DE); Bernhard Wleklinski, Werne (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 114 days.

(21) Appl. No.: 13/990,362

(22) PCT Filed: Dec. 2, 2011

(86) PCT No.: PCT/IB2011/055433
§ 371 (c)(1),
(2), (4) Date: Jul. 23, 2013

(87) PCT Pub. No.: WO2012/077025
PCT Pub. Date: Jun. 14, 2012

(65) Prior Publication Data
US 2013/0306438 A1    Nov. 21, 2013

(30) Foreign Application Priority Data
Dec. 6, 2010  (DE) ............... 20 2010 013 068 U

(51) Int. Cl.
*B65G 19/28* (2006.01)
*E21F 13/06* (2006.01)
*B65G 19/18* (2006.01)

(52) U.S. Cl.
CPC ............... *B65G 19/28* (2013.01); *B65G 19/18* (2013.01); *B65G 19/285* (2013.01); *E21F 13/066* (2013.01); *Y10T 403/7075* (2015.01)

(58) Field of Classification Search
USPC ................... 198/735.1, 735.2, 735.3, 860.2
See application file for complete search history.

(56) References Cited

U.S. PATENT DOCUMENTS

| 2,790,539 A | | 4/1957 | Wellesley |
|---|---|---|---|
| 3,842,966 A | * | 10/1974 | Blumenthal et al. ........ 198/735.1 |
| 4,420,075 A | * | 12/1983 | Skolik et al. ............... 198/735.2 |

(Continued)

FOREIGN PATENT DOCUMENTS

| CN | 101387201 A | 3/2009 |
|---|---|---|
| CN | 201502376 U | 6/2010 |

(Continued)

OTHER PUBLICATIONS

International Search Report and Written Opinion for International Application No. PCT/IB2011/055433, dated Apr. 10, 2013, 7 pages.

*Primary Examiner* — Douglas Hess

(57) ABSTRACT

A connecting device for connecting an attachment to a side member of a trough pan of an extracting device is provided. The connecting device includes first fittings on a side member and counter fittings on the attachment, which are detachably connectable to the first fittings. At least one retaining piece prevents detachment of fitting and counter fitting. The first fitting tapers upward in a trapeze-shaped manner and the counter fitting tapers upward in a trapeze-shaped manner, so that by a vertical movement, the first fitting and the counter fitting are able to be fitted into each other or to be detached from each other, and the first fitting and counter fitting are provided with locking strips and/or grooves which interlock in a locking state.

28 Claims, 4 Drawing Sheets

(56) References Cited

U.S. PATENT DOCUMENTS

| | | | | |
|---|---|---|---|---|
| 5,033,604 | A | * | 7/1991 | Steinkuhl et al. ......... 198/735.6 |
| 5,131,724 | A | * | 7/1992 | Bandy et al. .................... 299/43 |
| 5,272,289 | A | * | 12/1993 | Cocksedge et al. ........ 198/735.1 |
| 5,605,220 | A | * | 2/1997 | Krohm ....................... 198/735.6 |
| 5,871,261 | A | * | 2/1999 | Bandy et al. .................... 299/43 |
| 5,938,000 | A | * | 8/1999 | Fischer et al. ............. 198/735.4 |
| 6,478,143 | B1 | * | 11/2002 | Enomoto ...................... 198/838 |
| 6,896,121 | B2 | * | 5/2005 | Vorsteher et al. ........... 198/735.2 |
| 7,032,743 | B2 | * | 4/2006 | Vorsteher et al. ........... 198/735.1 |
| 7,152,730 | B2 | * | 12/2006 | Gerke ........................ 198/860.3 |
| 7,392,896 | B2 | * | 7/2008 | Wirtz et al. ................ 198/735.1 |
| 7,562,764 | B2 | * | 7/2009 | Schmidt et al. ............ 198/735.6 |
| 8,066,112 | B2 | * | 11/2011 | Klabisch et al. ........... 198/735.1 |
| 8,365,901 | B2 | * | 2/2013 | Schmidt et al. ............ 198/735.6 |
| 8,783,445 | B2 | * | 7/2014 | Ingendahl .................. 198/735.2 |
| 8,794,429 | B2 | * | 8/2014 | Fischer et al. ............. 198/735.3 |
| 2006/0070859 | A1 | * | 4/2006 | Pahlow et al. | |

FOREIGN PATENT DOCUMENTS

| | | |
|---|---|---|
| CN | 201502377 U | 6/2010 |
| CN | 101821478 A | 9/2010 |
| DE | 202004001476 U1 | 5/2004 |
| DE | 2020070 00 263 | 3/2008 |
| GB | 2 068 873 | 8/1981 |

* cited by examiner

CONNECTING DEVICE FOR A TROUGH PAN OF EXTRACTION DEVICES, TROUGH PAN AND ATTACHMENT THEREFOR

CROSS-REFERENCE TO RELATED APPLICATIONS

This application claims the benefit of priority to international patent application number PCT/IB2011/055433, having a filing date of Dec. 2, 2011, which claims the benefit of priority to German patent application number DE202010013068.9, having a filing date of Dec. 6, 2010, the complete disclosures of which are hereby incorporated by reference for all purposes.

TECHNICAL FIELD

The invention relates to a connecting device for connecting an attachment to a side member of a trough pan of an extracting device, said connecting device having first fittings arranged on the side member, having counter fittings which are arranged on the attachment and are detachably connectable to the fittings, and having at least one retaining piece, which in the closing position prevents detachment of fitting and counter fitting and in the opening position permits detachment. The invention additionally relates to a trough pan having a detachable attachment for extraction devices for the extraction of minerals, wherein by means of a connecting device, which has fittings on the trough pan, counter fittings on the attachment and at least one retaining piece that prevents detachment of fitting and counter fitting in the closed position, the attachment is securable in a detachable manner on the trough pan. The invention also relates to an attachment for a trough pan or for a corresponding connecting device.

BACKGROUND

Extraction machines, which are moved back and forth along a conveying device for the extracted coal, are used in underground extraction devices, e.g. for the extraction of coal. In the case of extraction devices of this type, which can be up to 400 m in length, special troughs are arranged in each case in the face end region in order to create the necessary installation space, not only to be able to drive the extraction machine as far as into the face end region, but also to be able to arrange the drives for the conveying device, and where applicable the extraction machine, in the face end region. Corresponding special troughs can consist, in particular, of so-called connecting troughs (shearer loader operation), in which the distance between upper run and lower run is increased in order, subsequently, to guide the chain about a chain wheel, and/or of wedge troughs (ploughing operation) where, in addition, the distance between the machine guide and the side member becomes increasingly greater over the length of the trough pan. Machine guide parts which are detachable from the trough pan in order to be able to undertake repairs on the plough, on the shearer loader or on the conveyor chain in the face end region are used in particular in the case of said special troughs. Securement between the detachable attachment and the trough pan is effected by means of connecting devices with a fitting and a counter fitting which are able to be locked using at least one retaining piece. The main scope of the present invention concerns corresponding wedge troughs and connecting troughs with detachable attachments for plough or shearer loader extraction plants. In principle, however, the invention is also applicable to other attachments which have to be detached from the trough pan.

A generic connecting device is known from DE 20 2004 001 476 U1 and the known connecting device includes, among other things, hook elements in the lower region of the side members, into which the detachable machine guide part is inserted by means of holding pieces, such that a separable hook joint connection is created in the lower region. In the case of the generic connecting device, the attachment and the side member only have to be prevented from pivoting apart by way of the retaining piece, to which end the retaining piece is realized either as a retaining strip that can be screw-connected in place or it is in the form of crescent-shaped liners which project beyond the side part and, in their turn, are secured against detachment by means of a screw bolt. The placing in position of the machine guide can certainly be made easier by using the hook joint connection. However, the detaching in particular of the screw bolt is cumbersome and time-consuming and can be made considerably more difficult, in particular, by the jamming of the bolts, liners or the retaining strip.

DE 202007000263 U1 makes known connecting means for shearer loader operations, said connecting means including retaining vices that jut out from the trough pan and wedge jaws that can be placed thereon in order to secure the attachments, which are provided with penetration windows for the retaining vices, on the trough pan.

SUMMARY

It is the object of the invention to create a connecting device as well as a trough pan and an attachment for this purpose, by means of which or with which the attachment is able to be mounted or removed in a quick and simple manner.

This object is achieved according to the invention with a connecting device where, in each case, fitting and counter fitting taper upward in a trapeze-shaped manner and, by means of a vertical movement, are able to be fitted into each other or to be detached from each other, wherein fitting and counter fitting are provided with locking strips and/or grooves which interlock at least in the locking state. In the case of the solution according to the invention, fitting and counter fitting are neither screw-connected nor secured by wedges, but rather the favourable mountability or demountability of the connecting device is brought about by the interaction between trapeze-shaped parts which can be joined together or detached from each other in a vertical movement. The trapezoidal shape of fitting and counter fitting has advantages, in particular, when detaching the connecting device as, in particular when the connecting device is used in coal mining where migrating and caking of small coal cannot be completely prevented, as a result of the trapeze-shaped development itself, small coal caking as early as directly after the start of the detaching movement can no longer prevent the fittings, in particular the locking strips and grooves, being pushed further apart. The trapeze-shaped development also makes the assembly easier, as the screw-connections or wedge-fastenings no longer have to be positioned one above the other in an irksome and precise manner and essentially the fittings and counter fittings only have to be moved one above the other in order, by utilizing the self-locating movement of the trapeze-shaped parts, then to allow the locking strips and grooves to slide into each other. A further advantage is that by dispensing with the screw-connecting or wedge-connecting elements that are otherwise used in the prior art, it is not possible for said elements to become deformed, which in the case of the generic connecting device could make the detaching of the attachments additionally more difficult. Using the connecting device according to the invention, it is consequently possible to detach attachments even when extremely high cross forces have been exerted into the fittings and counter fittings, connected by positive locking, by the extraction machine during the extraction travel or during displacement of the extraction plant. This means that the function of the retaining piece can at the same time be reduced to a pure blocking function, which only has to prevent unintended migration of the attachment in relation to the trough pan, without having to absorb the cross forces in operation in order to prevent detachment of the connecting device.

According to the design variant that is preferred in particular, the fitting is secured on the outer side of the side member in such a manner that the fitting juts out beyond the outer side of the side member. This makes it easier to move fitting and counter fitting together even in tight faces because the parts of the connecting device to be joined together are able to be positioned well in relation to each other.

According to a development that is advantageous in particular in the case of attachments with a heavy own weight, the fittings consist of a box structure with at least two outer longitudinal struts and cross struts that connect them, wherein the longitudinal struts project vertically and have rear sides which face each other and front sides which face away from each other, on which, in each case, a locking strip is realized. The locking strips then point outwards. In this case, the locking strips can extend in a continuous manner over the height of the longitudinal struts. It is advantageous, in particular, when the cross struts extend between the rear sides of the longitudinal struts such that the component weight introduced into the longitudinal struts can be taken up by the cross struts, without the securement between the longitudinal strut, on the one hand, and the side member, on the other hand, being acted upon in an excessive manner. A groove or a groove-like space can be realized between the locking strip and the side wall, it then being possible for said groove or groove-like space to be engaged behind by the counter fitting at least in the locking state. The longitudinal struts can consist, in particular, of profiled cast parts with a constant cross section, said profiled cast parts being arranged in a slightly inclined manner with reference to the vertical to obtain the trapezoid shape of the fittings. It is particularly advantages when the cross strut that is located higher is shorter in length than the cross strut that is located lower, as a result of which longitudinal struts and cross struts can be realized to form a structure that is rigid to load. According to a particularly simple development, locking holes can be realized in the side members for the insertion of the retaining pieces. To this end, at least one locking hole can be arranged in extension above one of the longitudinal struts and/or in the cross strut.

Counter fittings can preferably be used with the afore-described fittings, said counter fittings are realized as U-shaped box parts and have two longitudinal strips projecting vertically and at least one cross strip and a rear wall. According to a preferred development, the longitudinal struts on the strip edges that face each other can then be realized with projecting locking strips for interlocking in grooves or spaces on the longitudinal struts of the associated fittings. The corresponding development provides for sturdy counter fittings, by means of which attachments with a high own weight and/or attachments into which, for example, the displacement forces can be introduced for displacement of the trough pans, can be securely mounted on the side members. Thus, for example, connecting joints for displacing beams can be secured on the rear side of the rear wall of the attachments. In the case of the counter fittings, it is particularly advantageous when at least one locking opening is realized in the cross strip and/or in the longitudinal strip for the insertion of the retaining piece.

According to an alternative development which, in particular, offers advantages when the attachments consist, for example, only of spill plates to raise, for example, a conveyor trough, the fittings can consist of fitting plates with a T-shaped cross section, wherein the width of the fitting plates reduces as the height increases, preferably in an even manner. It is advantageous, in particular, when the fitting plate itself is provided with a locking hole for the insertion of a retaining piece. Preferably at least two fitting plates should be secured on the side member.

In particular where the fittings are developed as upwardly tapering fitting plates, it is possible to use counter fittings which are arranged on the bottom edge of attachments that are realized as side plates or spill plates and preferably consist of slide-in boxes for the fittings, in particular for the fitting plates, said slide-in boxes being mounted on the rear face of the side plates or spill plates. Here too, it is advantageous when each side plate is provided with at least two counter fittings, wherein an insertion opening for a retaining piece is additionally preferably provided in the region of each slide-in box and/or between two counter fittings.

In all the developments it is advantageous when the fittings are arranged on both side members of the trough pan and/or when the fittings have a plane of symmetry.

The aforementioned object is achieved with a trough pan that has a detachable attachment, by said attachment being able to be attached to the trough pan by means of a connecting device which has fittings and counter fittings, wherein the fitting tapers upward in a trapeze-shaped manner and, by means of a vertical movement, is connectable to a counter fitting that tapers upward in a trapeze-shaped manner or is detachable from said counter fitting, and the fitting is provided with locking strips and/or grooves for interlocking at least in the locking state with grooves and/or locking strips on the counter fitting. A main area of application of corresponding trough pans is formed by connecting troughs which are used in the region of the face ends and by means of which the upper run and the lower run are at an increasing distance from each other until the distance is sufficient for the conveyor chains to be able to be driven or guided at a chain wheel.

Finally, the above object is also achieved with an attachment for a corresponding connecting device or a trough pan, by the counter fitting tapering upward in a trapeze-shaped manner and, by means of a vertical movement, being mountable with a fitting that tapers upward in a trapeze-shaped manner on a trough pan or being detachable from said fitting, wherein the counter fitting is provided with locking strips and/or grooves for interlocking at least in the locking state in grooves and/or locking strips on the fitting.

In the case of all the developments it is particularly advantageous when the retaining pieces consist of locking bolts which are lockable in a locking position by means of U-shaped retaining clips.

Further advantages and developments of a connecting device according to the invention are clear from the following description of exemplary embodiments of trough pans with connecting devices according to the invention as well as mountable or mounted attachments.

DETAILED DESCRIPTION

Figure 1:
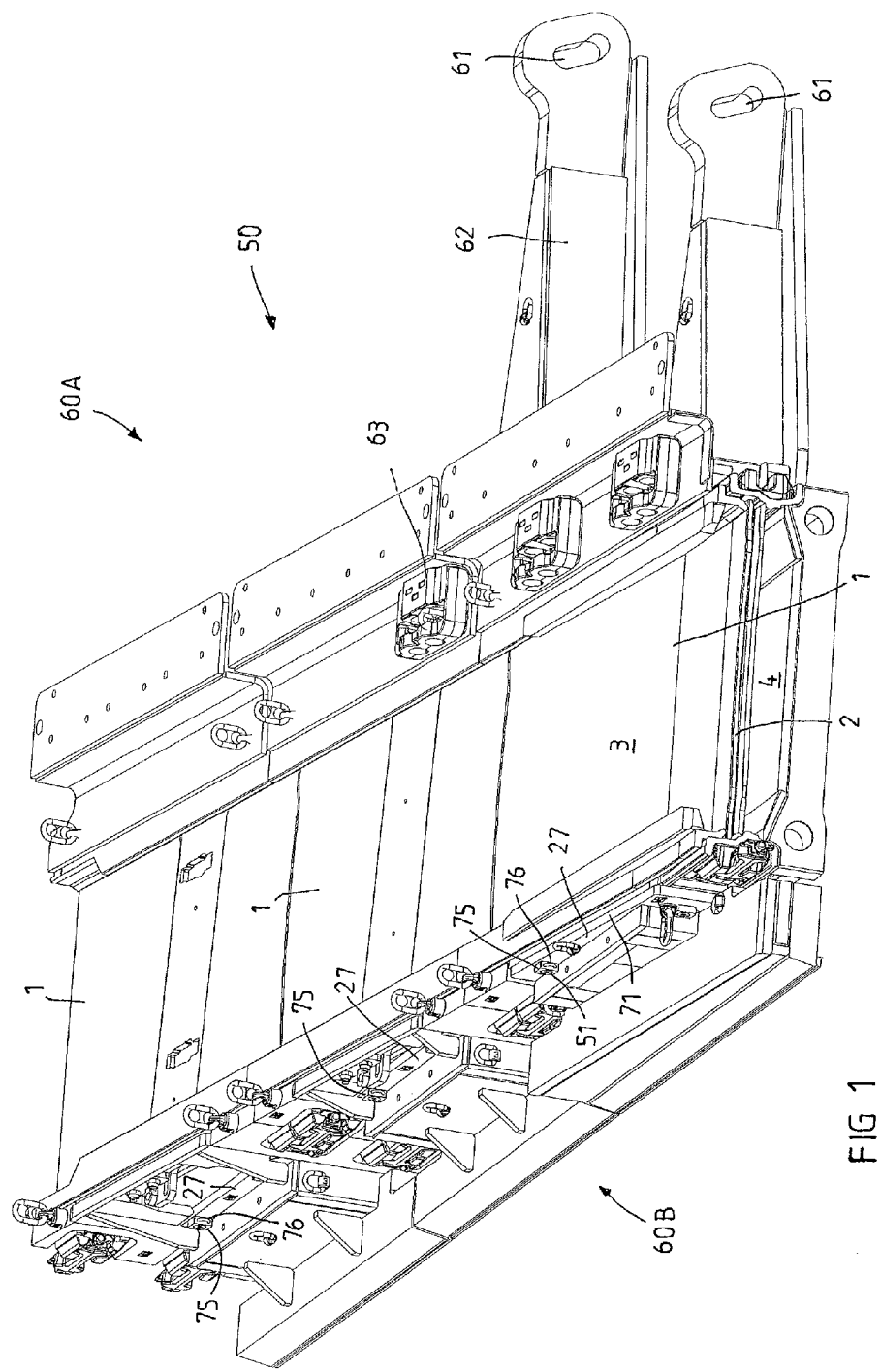
FIG. 1 shows a perspective view of several trough pans of a connecting trough arrangement for the face end region, with connected attachments according to a first exemplary embodiment.
Figure 2:
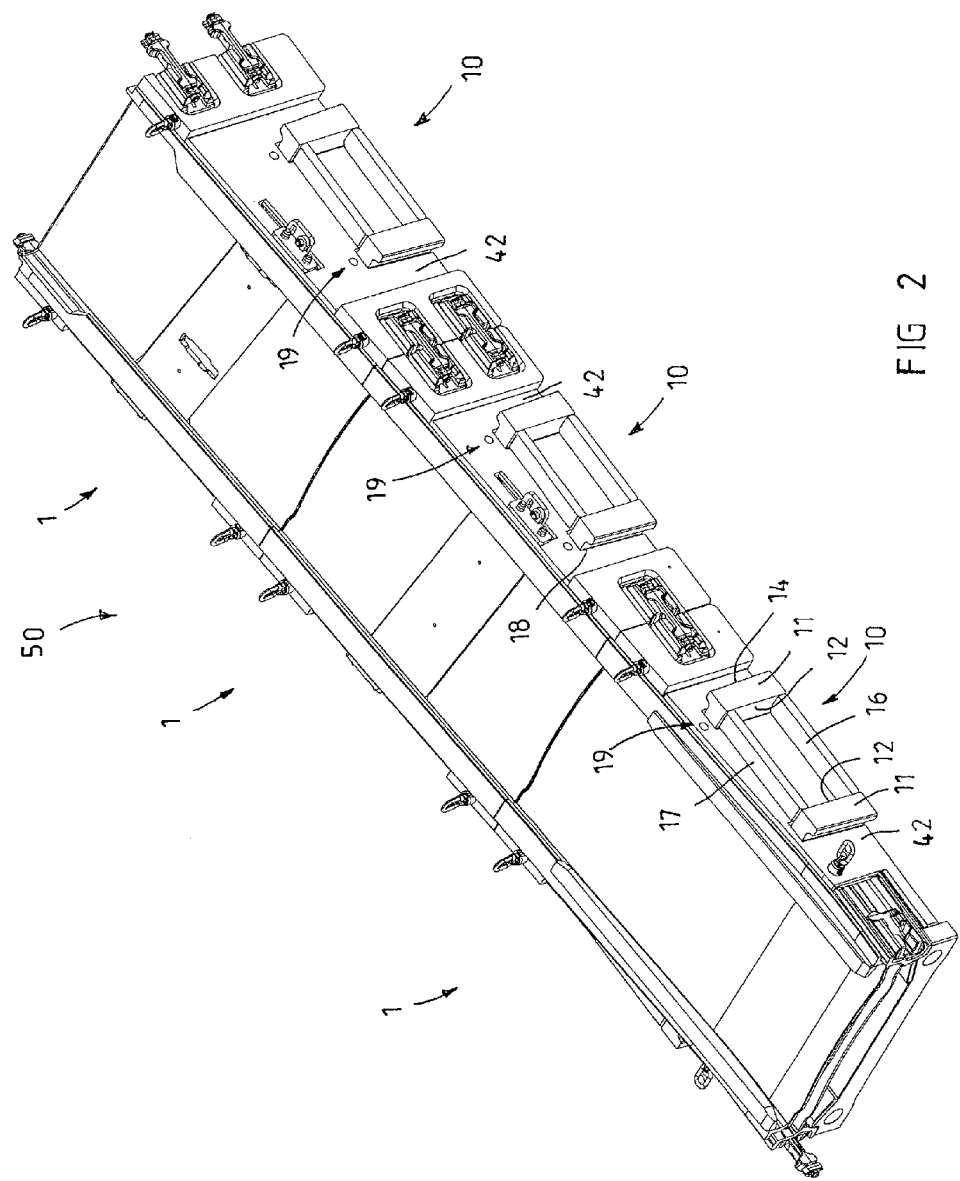
FIG. 2 shows a perspective view of the connecting trough arrangement from FIG. 1, without attachments.
Figure 3:
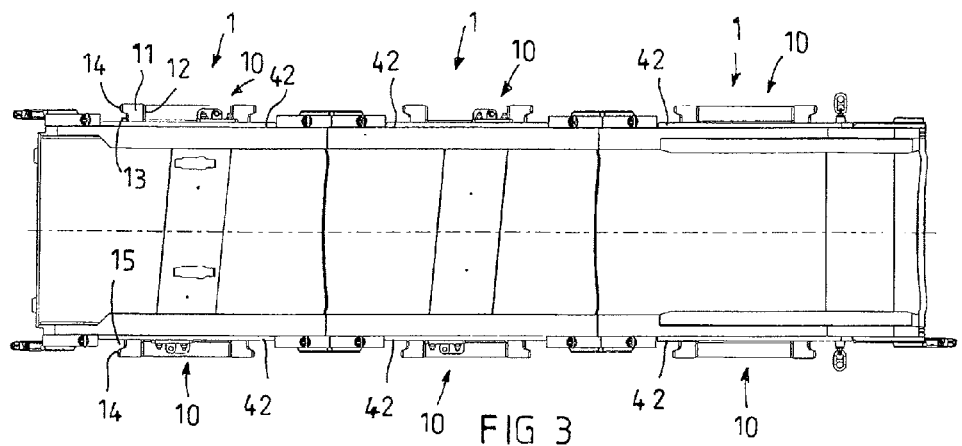
FIG. 3 shows a top view of the connecting trough arrangement from FIG. 2.

In FIGS. 1 to 5 the reference 50 is given to a connecting trough arrangement overall, which is mounted in an underground face conveyor between conveyor trough pans (not shown) and a machine frame (also not shown) that receives the chain wheel for the conveyor. The connecting trough arrangement 50, in the exemplary embodiment shown, is assembled from several trough pans, each given the reference 1, the core features of which are designed the same, but where the distance between the conveyor run 3, which is located above a conveyor bottom 2, and a return run 4, which is located below the conveyor bottom 2, increases from front to back in FIG. 1. In the case of the connecting trough arrangement 50 shown in FIG. 1, attachments 60A and 60B, which perform different functions, are connected on both sides of the trough pans 1. With the connecting trough arrangement 50 operating in an underground face conveyor, the fittings 60A on the right-hand side in FIG. 1 are positioned on the goaf side, as displacing beams can be connected to the connecting joints 61, which, in this case, are connected to the attachments 60A by means of arms 62 of various lengths, said displacing beams being supported on support frames, by means of which an underground mining face is kept open, as is known to the expert in underground mining. The connecting trough arrangement 50 shown in FIG. 1 is provided for an extracting device with a shearer loader, and bearing brackets 63 are secured on an angle plate 64, which here forms a component of each goaf-side attachment 60A, by means of which bearing brackets drive rods (not shown) are able to be supported, on which a shearer loader (not shown) as extraction machine is guided on the goaf side. In the case of the connecting trough arrangement 50 according to FIG. 1, the attachments 60B are once again positioned in operation on the working face side and form, at least only in a partial manner, a machine track 71 on which the shearer loader can also be guided on the working face side of the conveyor trough 3 and can be moved into the face end region, in which the connecting trough arrangement 50 is arranged.

The invention according to the illustrated embodiments is shown to include the fundamental design of the attachments 60A, 60B and the trough pans 1 of the connecting trough arrangement 50, but is directed more particularly to a connecting device which includes fittings and counter fittings, by means of which attachments 60A, 60B that are arbitrary in principle are able to be connected in the simplest manner possible to the connecting trough arrangement 50 or to the trough pans 1 thereof. The connecting of the attachments 60A, 60B to the trough pans 1 is effected both on the working face side and on the goaf side by way of similarly designed fittings on the one side and counter fittings on the other side as well as retaining pieces which together form the connecting device according to the invention. To explain the design and the individual elements of the connecting device according to the invention, reference is now made to FIGS. 2 to 5, in which fittings 10 and counter fittings 20 according to a first development of a connecting device according to the invention are shown.

FIG. 2 makes clear again that the connecting trough arrangement 50 is assembled from three trough pans 1, the height of which in FIG. 2 increases from left to right. All three trough pans 1 here have on both sides, in each case, side members 42 which consist of sturdy plates, on which, as FIG. 3 in particular clearly shows, in each case fittings 10 are mounted on both sides so as to jut out beyond the side member 42. The basic structural design of the fittings 10 themselves is in each case identical and consequently the description is only given for one of the fittings 10; it has already been pointed out here, however, that the width and/or height of the individual fittings 10, and consequently also that of the counter fittings that are connectable thereto, can be different from trough pan 1 to trough pan 1, as certain attachments 60A, 60B can only be used in each case on a certain trough element of the connecting trough arrangement 50. In the case of the connecting trough arrangement 50, there is, however, no stipulation as to which of the two side members 42 is arranged on the goaf side and which is arranged on the working face side, rather the same connecting trough arrangement 50 and the same attachments are able to be used at both face ends without conversion measures.

Each fitting 10 includes two longitudinal struts 11, which are arranged in a mirror-inverted manner to each other and in a symmetrical manner in relation to a vertical centre plane and have rear sides 12 which face each other as well as front sides 13 which face away from each other, on which is realized a strip-shaped projection as locking strip 14 which extends over the entire height of the longitudinal strips 11. As is made very clear in particular in the top view in FIG. 3, a space 15 is created between the locking strip 14 and the outer face of the side member 42 by the locking strip 14 protruding on the front side 13. Two cross struts 16, 17 are arranged here between the rear sides 12 and are preferably welded to the rear sides 12 of the longitudinal struts 11. The two longitudinal struts 11, in this case, have a constant cross section over their height and the longitudinal struts 11 are arranged in a slightly inclined manner in relation to the vertical at an oblique angle here of in each case, for instance, 2°-3°, another value of between 1° and e.g. 6° also being possible, as a result of which the fittings 10 taper upward overall in a trapeze-shaped and symmetrical manner at corresponding to double the oblique angle of each longitudinal strut. To stiffen the fittings 10, the two cross struts 16, 17 are preferably welded to the rear sides 12 of the longitudinal struts 11 and are positioned parallel to each other, as a result of which the upper cross strut 17 is slightly shorter than the lower cross strut 16. The cross struts 16, 17 and the longitudinal struts 11 can be welded together to form one assembly, which is screw-connected to the trough pans 1 from behind through windows 18 in the side member 42. However, the fittings 10 can also be welded on or secured to the side members 42 in another suitable manner. On account of the trapezoid shape of the fittings 10 and of the locking strips 14 projecting beyond the side of the longitudinal strips 11, counter fittings assembled together to form one assembly can be slid on the fittings 10 exclusively from above for mounting or can be detached by means of a vertical movement upward.

Figure 4:
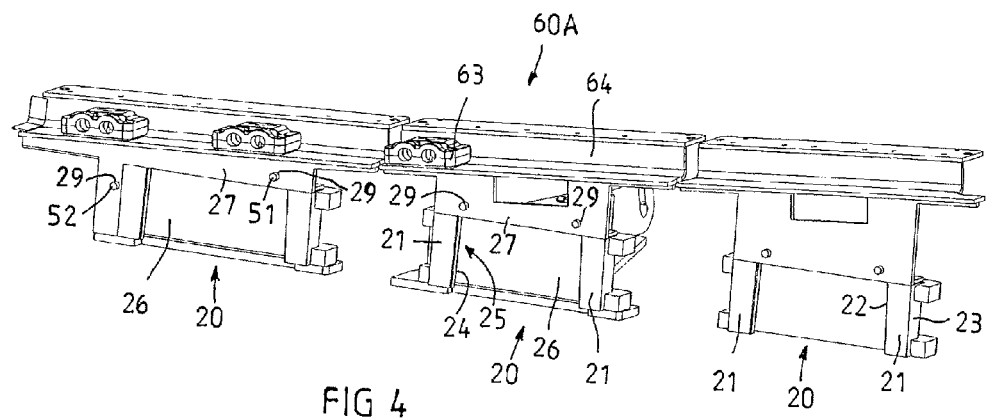
FIG. 4 shows a perspective view of the attachments that are mounted on the goaf side of the connecting trough arrangement from FIG. 1 and have the counter fittings.
Figure 5:
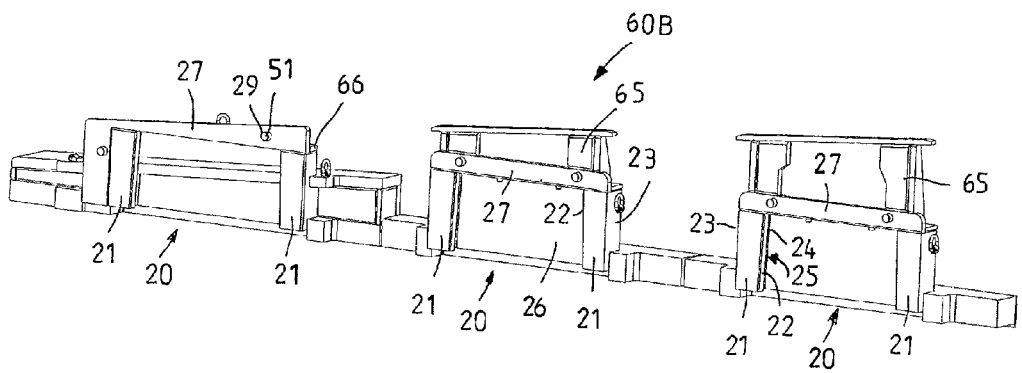
FIG. 5 shows a perspective view of the attachments having the counter fittings for the working face side of the connecting trough arrangement from FIG. 1.

FIG. 4 shows a detailed view of the attachments 60A for the goaf side and FIG. 5 shows the attachments 60B for the working face side of the connecting trough arrangement 50. FIGS. 4 and 5, in each case, show the counter fittings 20 on the attachments 60A or 60B, each attachment 60A, 60B having different individual elements which are each provided with a shape and size matching a counter fitting 20 so that the counter fitting 20 is able to be joined to the associated fitting 10 on the trough pan 1 of the connecting trough arrangement 50. The actual size of the counter fittings 20 themselves can be different depending on at which position of the connecting trough arrangement (50, FIG. 1) the respective attachment 60A, 60B is used. Each counter fitting 20 in the exemplary embodiments shown consists of two longitudinal strips 21, which have front sides 22 which face each other and rear sides 23 which face away from each other. At least the front sides 22 which face each other extend in an inclined manner with respect to the vertical at at least the same oblique angle at which the longitudinal struts are aligned on the fittings (cf. FIG. 2). Over the entire height, the front sides 22 have a strip-shaped projection which forms a locking strip 24, behind which a space 25 extending over the height is realized between the locking strips 24 and a rear wall 26. The two longitudinal strips 21 projecting vertically are connected to each other at their upper ends by means of a cross strip 27, to which further attachments, such as the angle plate 64 with the stop brackets 63 on the attachments 60A or a support frame 65 or 66 in the case of the attachments 60B, can be connected. As the counter fittings 20 are realized in a U-shaped manner by the inclined longitudinal strips 21 and the cross strip 27 that connects them only at the top and at the same time are tapered upward in a symmetrical and trapeze-shaped manner, the counter fittings 20, together with the connected assemblies of the respective attachment, are only able to be slipped onto the fittings 10 on a trough pan from above. In the mounted state, the locking strips 24 on the counter fittings 20 then lock into the grooves or spaces 15 on the fittings 10 and at the same time the locking strips 14 on the fittings 10 lock into the grooves 25 on the counter fittings 20. The interaction between the grooves 15, 25 and the locking strips 14, 24 enables favourable guiding during the entire vertical movement for mounting the attachments on the trough pan or removing the attachments from the trough pan and, in this respect, for mounting on or removal from the connecting device that is formed by the fittings 10 and the counter fittings 20.

Retaining pieces 51, which prevent unintended relative displacements between counter fitting 20 and fitting 10, are used in the mounted state of fittings 10 and counter fittings 20. In FIGS. 1 to 5, the retaining pieces 51 consist, in each case, of cotter pins with a round locking shaft 52, which, on the one hand, locks into an associated locking hole 19 in the side members 42 in the mounted state and at the same time penetrates locking openings 29, for example on the longitudinal strips 21 or the cross strips 27 of the counter fittings. In the case of all counter fittings 20, at least one locking opening 29 is positioned in each case essentially above and in extension of one of the locking strips 24 on the longitudinal strips 21 and is situated on the cross strip 27. The cotter pins 51 cannot be mounted until the locking holes 19 and the locking openings 29, with the attachments mounted, therefore with the connecting device assembled, are aligned with respect to one another. To lock the cotter pins 51, in this case holding blocks 75 are welded in each case to the outer sides of the cross strips 27, as can be easily seen in FIG. 1, into which holding blocks the plug-in forks 76 can be inserted in order to secure the cotter pins 51 in their locking position against falling out.

Figure 6:
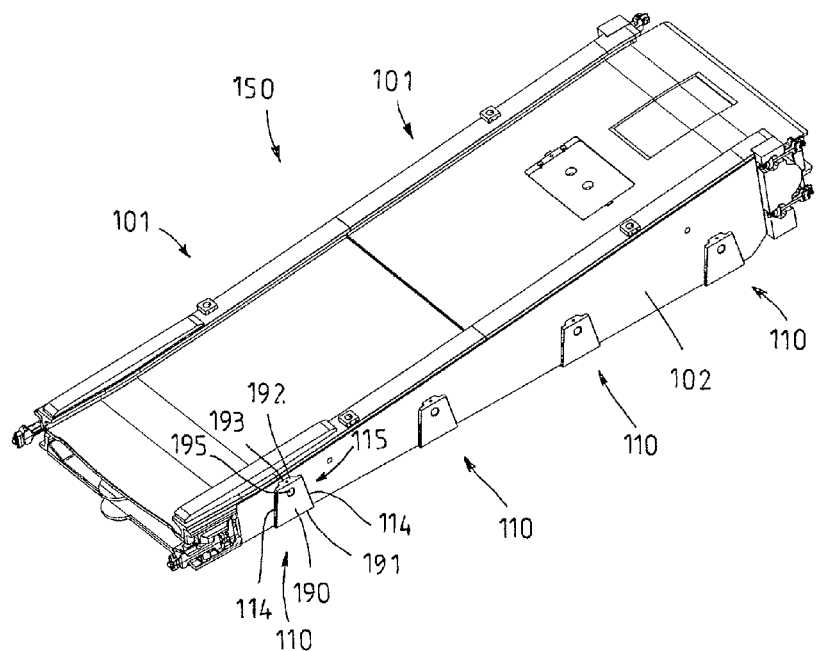
FIG. 6 shows a perspective view of a connecting trough arrangement with fittings according to a second exemplary embodiment.
Figure 7:
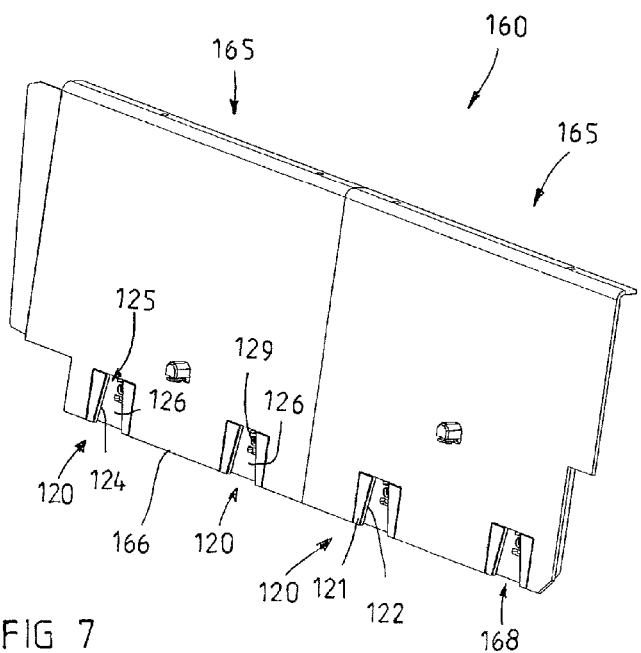
FIG. 7 shows the attachments with counter fittings for the connecting trough arrangement from FIG. 6.

FIGS. 6 and 7 show a connecting trough arrangement 150 which is formed by means of trough pans 101 as well as associated attachments 160 for use with a connecting device according to a second exemplary embodiment. The connecting trough arrangement 150, in this case, is assembled from only two different trough pans 101, on both sides a side member 102 being screw-connected to or welded on the trough pans 101, said side member extending substantially over the entire length of the connecting trough arrangement 150. In each case two fittings 110 per trough pan 101 are secured on the side member 102, each fitting 110 consisting only of a fitting plate 190 that preferably consists of a cast part. The fitting plate 190 has a substantially T-shaped cross section, the cross section of which reduces from a bottom side 191 to a top side 192 of the fitting plate 190. The fitting plates 190 are secured on the side members 102 in such a manner that they jut out beyond the outside of the side members 102. Locking strips 114 are formed on both outside edges of the fitting plate 190 by means of the plate portions on the fitting plates 190 jutting out to the side beyond the central web 193, a groove-shaped space 115 being created behind said locking strips between locking strip 114, central web 193 and side member 102. The fitting plate 190 is provided in the middle with a locking hole 195, which dips at least partially into the central web 193. The fitting plate 190 tapers in a trapeze-shaped manner towards the top side 192 which means that a counter fitting is only able to be slid onto the fitting plates 190 from above. The associated counter fittings 120 on the attachments parts 160, which are formed here by simple side spill plates 165 or side plates, are shown in FIG. 7. The counter fittings 120 are situated on the bottom edge 166 of the spill plates 165 and they are realized as slide-in boxes 168, which are realized on the rear face of the side plate or spill plate 165 and include two longitudinal strips 121, the front sides 122 of which that face each other extending in an inclined manner with respect to the vertical, as a result of which the counter fittings 120 too are tapered upward in a trapeze-shaped manner. Between a rear wall 126 and the edges of the side plates 121 that face each other there is a space 125, as the edges on the front sides 122 protrude as locking strips 124 in a suitable form beyond other part portions of the longitudinal strips 121. At the same time, therefore, the edges form the locking strips 124. In each case, a locking opening 129 is realized in the centre of the rear wall 126, into which locking opening a cotter pin or another retaining element as a retaining piece can be inserted when the counter fittings 120 and the fittings 110 are slid into each other and the locking holes 195 and the locking openings 129 are in alignment with each other. Here too a vertical movement is necessary in order to lift the attachments 160 with the counter fittings 120 upward from the fittings 110 and therefore to separate the connecting device that is formed by means of the fittings 110 and the counter fittings 120.

For the expert, numerous modifications that are to fall within the scope of protection of the attached claims are produced from the preceding description. The exemplary embodiment shown serves only to illustrate the different exemplary embodiments and, in particular, the shaping and the design of the fittings and counter fittings can vary. Thus, for example, the longitudinal struts can have a cross section that changes over their height in order to achieve the trapezoid shape.

The invention claimed is:

1. A connecting device for connecting an attachment to a side member of a trough pan of an extracting device, comprising:
    first fittings which are arranged on the side member, having counter fittings which are arranged on the attachment and are detachably connectable to the fittings, and having at least one retaining piece, which in a closing position prevents detachment of the first fittings and the counter fittings and in an opening position permits detachment;
    the first fittings tapering upward in a trapeze-shaped manner and the counter fittings tapering upward in a trapeze-shaped manner;
    wherein the first fittings and the counter fittings are able to be fitted into each other or to be detached from each other by only a vertical movement, and
    wherein first fittings and counter fittings are provided with locking strips and/or grooves which interlock at least in a locking state.

2. A connecting device according to claim 1, wherein the first fittings are secured on the outer side of the side member, jutting out beyond the side member.

3. A connecting device according to claim 1, wherein the first fittings comprise a box structure with at least two outer longitudinal struts and cross struts, and wherein the longitudinal struts project vertically and have rear sides which face each other and front sides which face away from each other, on which, in each case, a locking strip is disposed.

4. A connecting device according to claim 3, wherein the locking strip extends in a continuous manner over a height of the longitudinal strut.

5. A connecting device according to claim 3, wherein the cross struts extend between the rear sides of the longitudinal struts.

6. A connecting device according to claim 3, further comprising a groove disposed between the locking strip and the side member.

7. A connecting device according to claim 3, wherein the longitudinal struts comprise profiled cast parts with a constant cross section, and wherein the at least two cross struts comprise a higher cross strut and a lower cross strut, and the higher cross strut is shorter in length than the lower cross strut.

8. A connecting device according to claim 3, further comprising locking holes disposed in the side members for the insertion of retaining pieces, wherein at least one locking hole is positioned in extension above one of the longitudinal struts.

9. A connecting device according to claim 8, wherein the counter fittings comprise U-shaped box parts which have two longitudinal strips that project vertically, and at least one cross strip, and a rear wall.

10. A connecting device according to claim 9, wherein on the edges of the cross strips that face each other, the longitudinal struts are provided with projecting locking strips for interlocking in grooves or spaces on longitudinal struts on the first fittings.

11. A connecting device according to claim 10, further comprising connecting joints for displacing beams that are secured on the rear side of the rear wall.

12. A connecting device according to claim 9, wherein at least one locking opening is disposed in the cross strip and/or in the longitudinal strip for the insertion of the retaining piece.

13. A connecting device according to claim 1, wherein the first fittings comprise fitting plates with a T-shaped cross section, and the width of the fitting plates reduces as the height increases.

14. A connecting device according to claim 13, wherein the fitting plate is provided with a locking hole for the insertion of a retaining piece.

15. A connecting device according to claim 13, wherein at least two fitting plates are secured on the side member.

16. A connecting device according to claim 1, wherein the first fittings are arranged on both side members of the trough pan.

17. A connecting device according to one of claim 1, wherein the counter fittings are arranged on a bottom edge of side plates and the counter fittings comprise slide-in boxes for the counter fittings, the slide-in boxes being mounted on a rear face of the side plates.

18. A connecting device according to claim 17, wherein each side plate is provided with two counter fittings, and an insertion opening for a retaining piece is provided in the region of each slide-in box and/or between two counter fittings.

19. A trough pan for the extraction of minerals, comprising:
    an attachment that is securable in a detachable manner to the trough pan and includes counter fittings;
    a connecting device, which has fittings coupled to the counter fittings;
    at least one retaining piece that prevents detachment of the fittings and counter fittings in a closed position,
    wherein the fittings taper upward in a trapeze-shaped manner and the counter fittings taper upward in a trapeze-shaped manner and are connectable to one another by only a vertical movement, and
    wherein the fitting is provided with locking strips and/or grooves for interlocking at least in the locking state with grooves and/or locking strips on the counter fitting.

20. A trough pan according to claim 19, wherein the trough pan forms a member of a connecting trough arrangement.

21. A trough pan according to claim 19, wherein the counter fitting is provided with locking strips and/or grooves for interlocking, at least in the locking state with grooves and/or locking strips on the counter fitting.

22. A trough pan according to claim 19, wherein the at least one retaining piece comprises locking bolts which are lockable in a locking position by means of U-shaped retaining clips.

23. A connecting device for connecting an attachment to a side member of a trough pan of an extracting device, comprising:
    first fittings which are arranged on the side member, having counter fittings which are arranged on the attachment and are detachably connectable to the fittings, and having at least one retaining piece, which in a closing position prevents detachment of the first fittings and the counter fittings and in an opening position permits detachment;
    the first fittings tapering upward in a trapeze-shaped manner and the counter fittings tapering upward in a trapeze-shaped manner;
    wherein the first fittings and the counter fittings are able to be fitted into each other or to be detached from each other by a vertical movement, and
    wherein first fittings and counter fittings are provided with locking strips and/or grooves which interlock at least in a locking state;
    wherein the first fittings comprise a box structure with at least two outer longitudinal struts and cross struts, and wherein the longitudinal struts project vertically and have rear sides which face each other and front sides which face away from each other, on which, in each case, a locking strip is disposed.

24. A connecting device according to claim 23, wherein the first fittings are secured on the outer side of the side member, jutting out beyond the side member.

25. A connecting device according to claim 23, wherein the first fittings comprise fitting plates with a T-shaped cross section, and the width of the fitting plates reduces as the height increases.

26. A trough pan for the extraction of minerals, comprising:
- an attachment that is securable in a detachable manner to the trough pan and includes counter fittings;
- a connecting device, which has fittings coupled to the counter fittings;
- at least one retaining piece that prevents detachment of the fittings and counter fittings in a closed position,
- wherein the fittings taper upward in a trapeze-shaped manner and the counter fittings taper upward in a trapeze-shaped manner and are connectable to one another by a vertical movement,
- wherein the fitting is provided with locking strips and/or grooves for interlocking at least in the locking state with grooves and/or locking strips on the counter fitting
- wherein the at least one retaining piece comprises locking bolts which are lockable in a locking position by means of U-shaped retaining clips.

27. A trough pan according to claim 26, wherein the trough pan forms a member of a connecting trough arrangement.

28. A trough pan according to claim 26, wherein the counter fitting is provided with locking strips and/or grooves for interlocking, at least in the locking state with grooves and/or locking strips on the counter fitting.

\* \* \* \* \*